US009390443B2

(12) United States Patent
Ochiai

(10) Patent No.: US 9,390,443 B2
(45) Date of Patent: Jul. 12, 2016

(54) PRODUCT INFORMATION PROVIDING SERVER APPARATUS, PRODUCT INFORMATION DISPLAY PROGRAM, PRODUCT INFORMATION DISPLAY METHOD, PRODUCT INFORMATION PROVIDING SYSTEM, TERMINAL DEVICE, AND RECORDING MEDIUM ON WHICH PRODUCT INFORMATION DISPLAY PROGRAM IS RECORDED

(75) Inventor: Yukiko Ochiai, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 146 days.

(21) Appl. No.: 13/515,729

(22) PCT Filed: Jan. 27, 2011

(86) PCT No.: PCT/JP2011/051571
§ 371 (c)(1),
(2), (4) Date: Jun. 13, 2012

(87) PCT Pub. No.: WO2011/093364
PCT Pub. Date: Aug. 4, 2011

(65) Prior Publication Data
US 2012/0296779 A1 Nov. 22, 2012

(30) Foreign Application Priority Data
Jan. 29, 2010 (JP) ................................. 2010-019417

(51) Int. Cl.
*G06Q 30/00* (2012.01)
*G06Q 30/06* (2012.01)

(52) U.S. Cl.
CPC ................................... *G06Q 30/06* (2013.01)

(58) Field of Classification Search
CPC ........................... G06Q 30/0641; G06Q 30/06
USPC ........................................................ 705/27.1
See application file for complete search history.

(56) References Cited

U.S. PATENT DOCUMENTS

| 5,852,440 | A  | * | 12/1998 | Grossman et al. | ............ | 715/811 |
| 6,381,583 | B1 | * | 4/2002  | Kenney          | ........     | 705/26.8 |
| 7,996,282 | B1 | * | 8/2011  | Scott et al.    | ................ | 705/27.2 |
| 8,311,900 | B1 | * | 11/2012 | Bates et al.    | ................ | 705/27.2 |
| 8,392,281 | B1 | * | 3/2013  | Bashir et al.   | ................ | 705/26.7 |

(Continued)

FOREIGN PATENT DOCUMENTS

| JP | 2002-236694 A | 8/2002 |
| JP | 2003-030469 A | 1/2003 |

(Continued)

OTHER PUBLICATIONS

Vrechopoulos, A. P. (2004). What should an internet store look like? International Commerce Review : ECR Journal, 4(2), 42-44,47-49. Retrieved from http://search.proquest.com/docview/199531774?accountid=14753.*

*Primary Examiner* — Alexis Casey
(74) *Attorney, Agent, or Firm* — Sughrue Mion, PLLC

(57) ABSTRACT

The present invention provides, for example, a terminal device which allows users who do shopping utilizing a network to simulate a sense of doing shopping actually getting around in a store and enjoy shopping.
Product information of a plurality of products arranged based on genres to which products belong are displayed on a product list screen to be continuously browsed even if the products belong to different genres.

23 Claims, 8 Drawing Sheets

(56) References Cited

U.S. PATENT DOCUMENTS

| | | | |
|---|---|---|---|
| 2003/0212955 A1* | 11/2003 | Bischoff | 715/513 |
| 2007/0106949 A1* | 5/2007 | Narita et al. | 715/757 |
| 2008/0148179 A1* | 6/2008 | Sloo | 715/792 |
| 2009/0106090 A1* | 4/2009 | Rouhi et al. | 705/10 |
| 2010/0095238 A1* | 4/2010 | Baudet | 715/784 |
| 2011/0154216 A1* | 6/2011 | Aritsuka et al. | 715/745 |

FOREIGN PATENT DOCUMENTS

| | | |
|---|---|---|
| JP | 2004-220074 A | 8/2004 |
| WO | WO 0169364 A2 * | 9/2001 |

\* cited by examiner

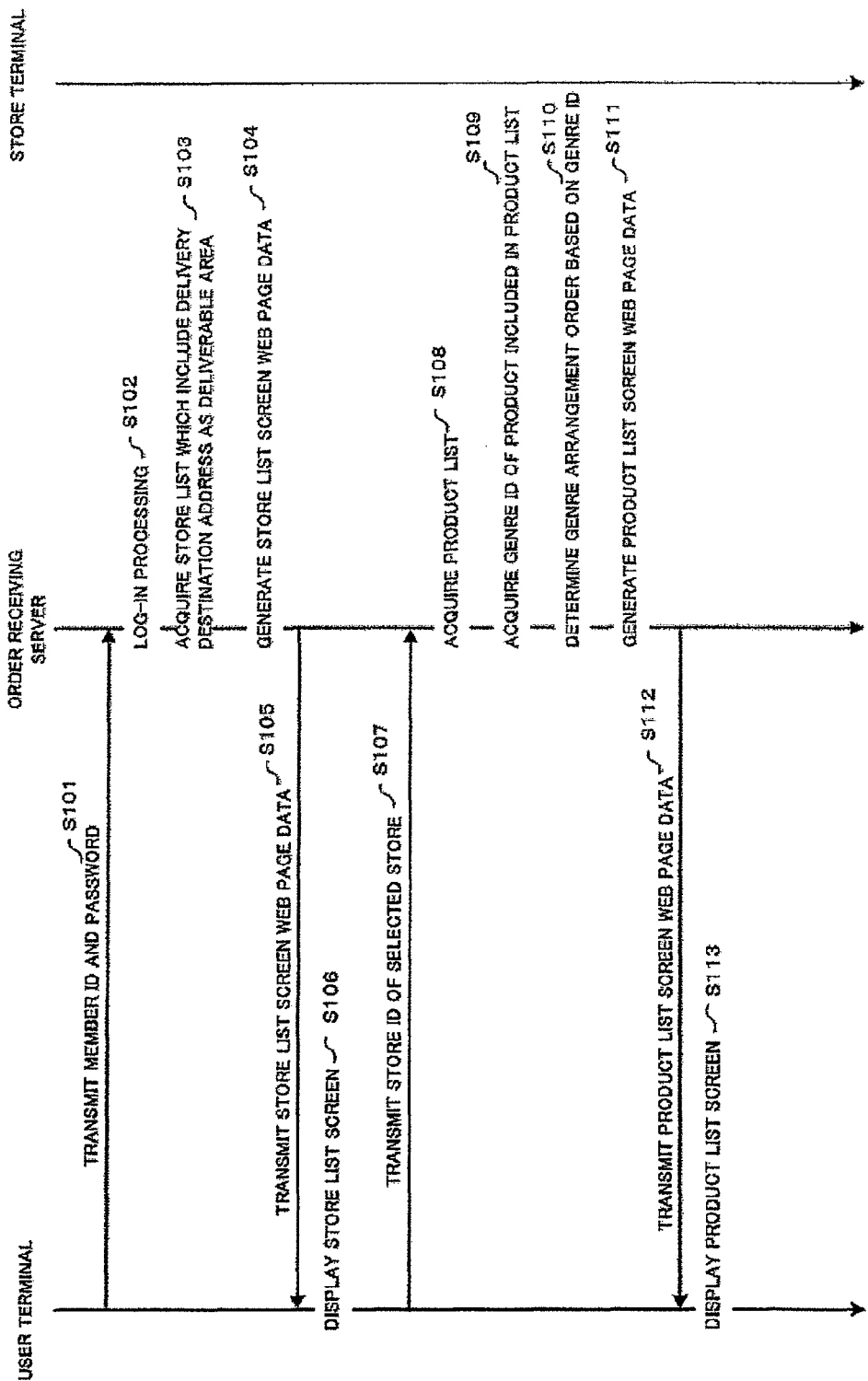

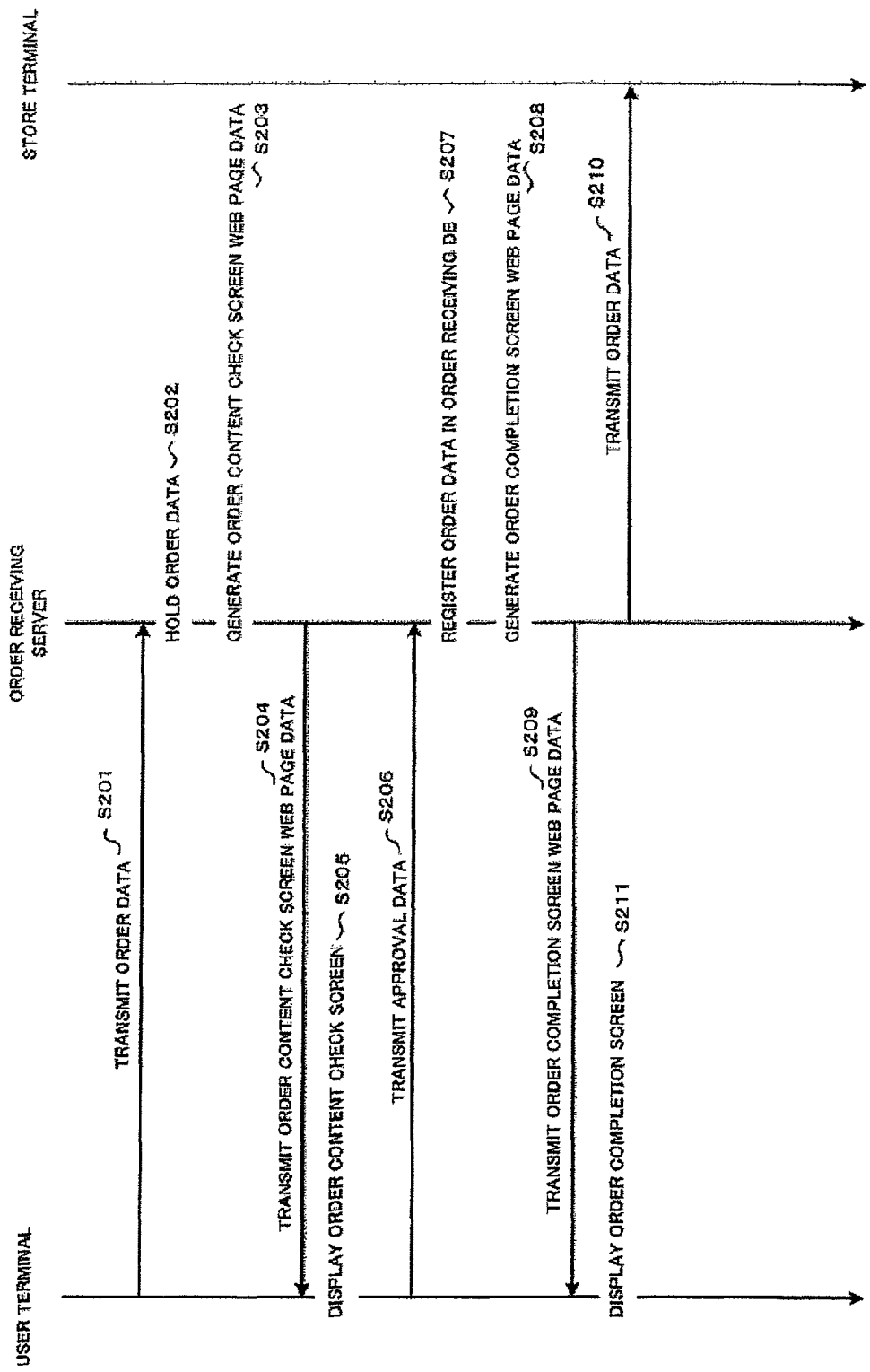

PRODUCT INFORMATION PROVIDING SERVER APPARATUS, PRODUCT INFORMATION DISPLAY PROGRAM, PRODUCT INFORMATION DISPLAY METHOD, PRODUCT INFORMATION PROVIDING SYSTEM, TERMINAL DEVICE, AND RECORDING MEDIUM ON WHICH PRODUCT INFORMATION DISPLAY PROGRAM IS RECORDED

CROSS REFERENCE TO RELATED APPLICATIONS

This application is a National Stage of International Application No. PCT/JP2011/051571 filed Jan. 27, 2011, claiming priority based on Japanese Patent Application No. 2010-019417, filed Jan. 29, 2010, the contents of all of which are incorporated herein by reference in their entirety.

TECHNICAL FIELD

The present invention relates to a technical field of Internet shopping utilizing a network such as Internet.

BACKGROUND ART

In recent years, sites (hereinafter "shopping mall sites") are known which provide shopping malls in which a lot of stores are opened on Internet. A user of a shopping mall selects a desired product from products participants listed in the shopping mall through a Web page transmitted to a user terminal from the shopping mall site, undergoes an order procedure and purchases the selected product (see, for example, Patent Literature 1).

CITATION LIST

Patent Literature

PTL 1: Japanese Patent Application Laid-Open No. 2002-236694

SUMMARY OF THE INVENTION

Problem to be Solved by the Invention

In the shopping mall site, when an order of a product is received, product information such as an image, name and price of a product is displayed on a display unit of a user terminal. However, in the shopping mall site, product information needs to be provided in a limited user screen, and therefore a target product needs to be searched for based on a product classification (genre) configured with a plurality of layers to display product information of the user's target product.

By contrast with this, there are cases where, when a user does shopping in an actual store, while the user moves to a store shelf which displays a target product, the user picks up a product the user does not intend to purchase, and purchases this product. As described above, upon shopping in an actual store, the user can enjoy getting around in a store with store shelves arranged, and pick up various products. However, upon shopping at shopping mall sites, the user cannot sufficiently enjoy shopping while getting around in stores and finding products.

The present invention is made in light of the foregoing, and an example of this object is to provide a product information providing server apparatus, a product information display program, a product information display method, a product information providing system, a terminal device and a recording medium having a product information display program recorded there on, which allow users who do shopping utilizing a network such as Internet to simulate a sense of doing shopping getting around in actual stores, and enjoy shopping.

Means for Solving the Problem

In order to solve the above problem, an invention described in claim 1 is a product information providing server apparatus that provides product information corresponding to a plurality of products covered by a store, to a terminal device connected through a network, wherein the product information providing server apparatus transmits display data that makes a display unit display a product list screen that displays the product information of the plurality of products arranged based on genres that products belong to such that products belonging to different genres are displayed to be continuously browsed, to the terminal device.

With the invention according to claim 1, products belonging to different genres are displayed to be continuously browsed, so that the user can simulate a sense of getting around in an actual store looking around at one store shelf after another which displays products per genre, and enjoy shopping.

An invention described in claim 2 is the product information providing server apparatus according to claim 1, wherein the product information includes product image information.

With the invention according to claim 2, product image information is displayed on the product list screen, so that the user can simulate a sense of actually looking at products displayed at store shelves, and enjoy shopping.

An invention described in claim 3 is the product information providing server apparatus according to claim 1 or 2, wherein the display data makes the product list screen display the product information of part of the plurality of products at a time in a state where a corresponding product can be selected.

With the invention according to claim 3, product information is displayed in a state where part of products can be selected at a time without being displayed on the product list screen once, so that the user can simulate a sense of sequentially following products displayed in actual store shelves with own eyes or picking up a product, and can enjoy shopping.

An invention described in claim 4 is the product information providing server apparatus according to claim 3, wherein the display data makes the product list screen display information showing a genre that a product displayed in a selectable state belongs to.

With the invention according to claim 4, information showing genres to which products displayed in a selectable state on the product list screen belong is displayed, so that the user can easily check a genre to which a product the user looks at a certain point of time belongs.

An invention described in claim 5 is the product information providing server apparatus according to claim 4, wherein: the display data makes the product list screen display information showing a genre that a product displayed in a selectable state belongs to and information showing a genre that is different from the genre and that one of products corresponding to product information of the plurality of products belong to; and when a genre different from a genre that a product displayed in a selectable state on the product list screen belongs to is selected, product information corresponding to a product belonging to the selected genre is displayed.

With the invention according to claim 5, when a genre different from a genre to which products displayed in a selectable state on the product list screen belong is selected, product information corresponding to products belonging to this selected genre is displayed, so that the user can immediately display a genre to which products the user wants to check belong, simulate a sense of virtually moving from one store shelf to another in an actual store and enjoy shopping.

An invention described in claim 6 is the product information providing server apparatus according to any one of claims 3 to 5, wherein, based on that a product change operation of displaying product information corresponding to the part of products different from product information corresponding to products displayed in a selectable state on the product list screen is detected, the display data switches display while sliding product information corresponding to products displayed in a selectable state on the product list screen to product information corresponding to the different part of products.

With the invention according to claim 6, based on a product change operation, display of product information corresponding to products displayed in a selectable state on the product list screen slides and switches to product information corresponding to different part of products. That is, the user can simulate a sense of checking products displayed in actual store shelves moving the field of view to another part of products at a time, and enjoy shopping.

An invention described in claim 7 is the product information providing server apparatus according to claim 6, wherein the display data is Web page data for displaying the product list screen, and causes the sliding in a direction orthogonal to a longitudinal direction of the product list screen defined by the Web page data.

With the invention according to claim 7, display of product information switches sliding in a direction orthogonal to a longitudinal direction of the product list screen, so that, even when the user needs to scroll the screen in the longitudinal direction to check the entire area of the product list screen, the user can check product information without scrolling the screen.

An invention described in claim 8 is the product information providing server apparatus according to claim 6 or 7, wherein the display data makes the product list screen display product information corresponding to products displayed in the selectable state, and display product information corresponding to products which need to be newly displayed in a selectable state when the product change operation is detected, in a non-selectable state.

With the invention according to claim 8, product information corresponding to products newly displayed in a selectable state when the product change operation is detected is displayed in a non-selectable state, so that the user can check products, which are displayed the next time in a selectable state by performing the product change operation, without performing the product change operation, thereby promoting a change to the next screen.

An invention described in claim 9 is the product information providing server apparatus according to any one of claims 1 to 8, wherein the display data makes the product list screen continuously display product information of the plurality of products arranged based on genre rank information that defines a rank when the each genre is arranged.

With the invention according to claim 9, product information is displayed based on a genre rank information set on the product information providing server apparatus side (store side). That is, the user can simulate a sense of doing shopping in an actual store looking around at store shelves in which the stores display freely products per genre, and can enjoy shopping.

An invention described in claim 10 is the product information server apparatus according to claim 1, the product information server apparatus comprising: a genre rank determining means that determines an arrangement rank of genre information that products belong to, in the terminal device; a display data generating means that generates the display data that makes the display unit display the product list screen that displays product information of the plurality of products arranged based on a rank of the genre information determined in the genre rank determining means such that even products belonging to a different genre can be continuously browsed; and a transmitting means that transmits the display data generated by the display data generating means, to the terminal device.

With the invention according to claim 10, products belonging to different genres are displayed to be continuously browsed, so that the user can simulate a sense of getting around in an actual store looking around at one store shelf to another which displays products per genre, and enjoy shopping.

An invention described in claim 11 is the product information providing server apparatus according to claim 10, further comprising a purchase history storage means that stores a purchase history in a past per user, wherein the genre rank determining means refers to the purchase history storage means, and determines a rank of the genre information such that a genre including more products a user of the terminal device purchased in a past defines an upper rank.

With the invention according to claim 11, a genre including more products which were purchased by the user in the past is arranged in the front, so that the user can check products which the user frequently purchases, at an earlier stage.

An invention described in claim 12 is the product information providing server apparatus according to claim 10, further comprising a purchase history storage means that stores a purchase history in a past per user, wherein the genre rank determining means refers to the purchase history storage means, and determines a rank of the genre information according to an order a user of the terminal device purchased a plurality of products during one shopping in a past.

With the invention according to claim 12, the rank to arrange genres according to the order the user purchased a plurality of products during one shopping is determined, so that the user can check products in a genre order matching a user's preference and thinking route.

An invention described in claim 13 is the product information providing server apparatus according to claim 10, wherein the genre rank determining means determines a rank of the genre information such that a genre including more sales products defines an upper rank.

With the invention according to claim 13, a genre including more sale products is arranged in the front, so that the user can efficiently check sale products.

An invention described in claim 14 is the product information providing server apparatus according to claim 10, wherein the genre rank determining means determines a rank of the genre information such that a genre comprising a higher mean discount rate of products included in a genre is defined as an upper rank.

With the invention according to claim 14, a genre comprising a higher mean discount rate of products included in a genre is arranged in the front, so that the user can efficiently check sales products.

An invention described in claim 15 is a product information display program causing a computer to function as: a product information receiving means that is connected to a product information providing server apparatus through a network, and that receives product information of a plurality of products corresponding to products covered by a store; a display means that displays a product list screen that displays the received product information of the plurality of products; and a display control means that makes a display unit display a product list screen that displays the received product information of the plurality of products arranged based on genres that products belong to, such that products belonging to different genres can be continuously browsed.

With the invention according to claim 15, products belonging to different genres are displayed to be continuously browsed, so that the user can simulate a sense of getting around in an actual store looking around at one shelf to another which displays products per genre, and enjoy shopping.

An invention described in claim 16 is a product information display method comprising: a step of, at a computer, connecting to a product information providing server apparatus through a network, and receiving product information of a plurality of products corresponding to products covered by a store; a step of, at the computer, displaying a product list screen that displays the received product information of the plurality of products; and a step of, at the computer, making a display unit display a product list screen that displays the received product information of the plurality of products arranged based on a genre that products belong to, such that products belonging to a different genre can be continuously browsed.

With the invention according to claim 16, products belonging to different genres are displayed to be continuously browsed, so that the user can simulate a sense of getting around in an actual store looking around at one shelf after another which displays products per genre, and enjoy shopping.

An invention described in claim 17 is a product information providing system that comprises a product information providing server apparatus that provides product information of a plurality of products corresponding to products covered by a store; and a terminal device that is connected to the product information providing server apparatus through a network, wherein the terminal device comprises: a product information receiving means that receives product information of a plurality of products from the product information providing server apparatus; and a display control means that makes a display unit display a product list screen that displays the received product information of the plurality of products arranged based on genres that products belong to, such that products belonging to different genres can be continuously browsed.

With the invention according to claim 17, products belonging to different genres are displayed to be continuously browsed, so that the user can simulate a sense of getting around in an actual store looking around at one store shelf after another which displays products per genre, and enjoy shopping.

An invention described in claim 18 is a terminal device that is connected to a product information providing server apparatus that provides product information corresponding to products covered by a store, through a network, the terminal device comprising: a product information receiving means that receives product information of a plurality of products from the product information providing server apparatus; and a display control means that makes a display unit display a product list screen that displays the received product information of the plurality of products arranged based on genres that products belong to, such that products belonging to different genres can be continuously browsed.

With the invention according to claim 18, products belonging to different genres are displayed to be continuously browsed, so that the user can simulate a sense of getting around in an actual store looking around at one store shelf after another which displays products per genre, and enjoy shopping.

An invention described in claim 19 is the terminal device according to claim 18, wherein the display control means makes the product list screen display the received product information of part of the plurality of products at a time in a state where a corresponding product can be selected.

With the invention according to claim 19, product information is displayed in a state where part of products can be selected at a time without displaying all pieces of product information received from the product information providing server apparatus, on the product list screen once, so that the user can simulate a sense of sequentially following products actually displayed in store shelves with own eyes or picking up a product, and can enjoy shopping.

An invention described in claim 20 is the terminal device according to claim 19, wherein: the display control means makes the product list screen display information showing a genre that a product displayed in a selectable state belongs to and information showing a genre that is different from the genre and that one of products corresponding to the received product information of the plurality of products belong to; and when a genre different from a genre that a product displayed in a selectable state on the product list screen belongs to is selected, product information corresponding to a product belonging to the selected genre is displayed.

With the invention according to claim 20, when a genre different from a genre to which products displayed in a selectable state on the product list screen belong is selected, product information corresponding to products belonging to this selected genre is displayed, so that the user can immediately display a genre to which products the user wants to check belong, simulate a sense of virtually moving from one store shelf to another in an actual store and enjoy shopping.

An invention described in claim 21 is the terminal device according to claim 19 or 20, further comprising: a change operation detecting means that detects a product change operation of displaying product information that is different from product information corresponding to a product displayed in a selectable state on the product list screen and that matches the part of products, wherein, based on that the product change operation is detected, the display control means switches display while sliding product information corresponding to products displayed in a selectable state on the product list screen to product information corresponding to the different part of products.

With the invention according to claim 21, based on a product change operation, display of product information corresponding to products displayed in a selectable state on the product list screen slides and switches to product information corresponding to different part of products. That is, the user can simulate a sense of checking products displayed in actual store shelves moving the field of view to another part of products at a time, and enjoy shopping.

An invention described in claim 22 is the terminal device according to claim 21, wherein: the receiving means receives the product information as Web page data; and the display control means displays the product list screen based on the Web page data, and causes the sliding in a direction orthogonal to a longitudinal direction of the product list screen defined by the Web page data.

With the invention according to claim 22, display of product information switches sliding in a direction orthogonal to a longitudinal direction of the product list screen, so that, even when the user needs to scroll the screen in the longitudinal direction to check the entire area of the product list screen, the user can check product information without scrolling the screen.

An invention described in claim 23 is a recording medium on which a product information display program is recorded, the product information display program causing a computer to function as: a product information receiving means that is connected to a product information providing server apparatus through a network, and that receives product information of a plurality of products corresponding to products covered by a store; a display means that displays a product list screen that displays the received product information of the plurality of products; and a display control means that makes a display unit display a product list screen that displays the received product information of the plurality of products arranged based on genres that products belong to, such that products belonging to different genres can be continuously browsed.

Effect of the Invention

Consequently, according to the present invention, product information of a plurality of products arranged based on a genre are continuously displayed on the product list screen, so that the user can simulate a sense of actually getting around in a store looking around at one store shelf after another which displays products per genre.

BRIEF DESCRIPTION OF THE DRAWINGS

FIG. 7 is a sequence diagram illustrating an operation example of an order receiving system according to the present embodiment.

FIG. 8 is a sequence diagram illustrating an operation example of an order receiving system according to the present embodiment.

MODES FOR CARRYING OUT THE INVENTION

Hereinafter, an embodiment of the present invention will be described with reference to the accompanying drawings. In addition, an embodiment which will be described below is an embodiment where the present invention is applied to an order receiving system.

[1. Overview of Configuration and Function of Order Receiving System]

First, an overview of a configuration and function of an order receiving system S according to an embodiment of the present invention will be described using FIG. 1.

Figure 1:
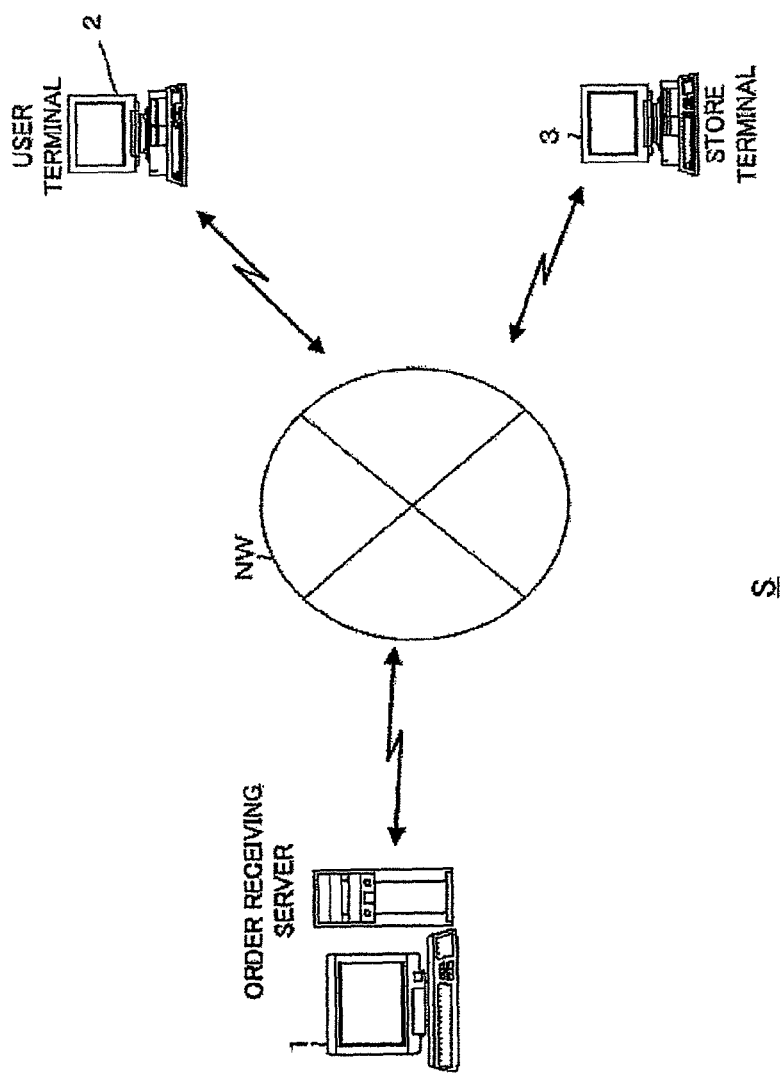
FIG. 1 is a view illustrating an example of a schematic configuration of an order receiving system according to the present embodiment.

As illustrated in FIG. 1, the order receiving system S is formed as a net supermarket site including an order receiving server 1 (an example of a "product information providing server apparatus"), a user terminal 2 (an example of a "terminal device") and a store terminal 3. In addition, with the example of FIG. 1, for ease description, although one user terminal 2 is illustrated, multiple user terminals can actually access the order receiving server 1. Similarly, the number of store terminals 3 also corresponds to the number of supermarkets which join the net supermarket site. Meanwhile, the net supermarket refers to a delivery service which receives an order of a product through a net supermarket site provided on Internet by an existing supermarket or a delivery dedicated vendor which does not have a store, and which delivers an ordered product to a customer's house.

The order receiving server 1, user terminal 2 and store terminal 3 can transmit and receive data to and from each other through a network NW by applying, for example, TCP/IP to a communication protocol. In addition, the network NW is constructed with, for example, Internet, a dedicated communication line (for example, CATV (Community Antenna Television) line), a mobile communication network (including, for example, a base station) and a gateway.

The order receiving server 1 is disposed to run a net supermarket site in which supermarkets join, and receives an order of a product from the user terminal 2 and delivers order content to the store terminal 3 disposed on the supermarket side. Particularly, the order receiving server 1 according to the present embodiment makes the user terminal 2 display a product list screen which continuously displays product information of a plurality of products arranged based on genres to which products belong.

The user terminal 3 has a Web browser function, and transmits, for example, a HTTP (Hyper Text Transfer Protocol) request to the order receiving server 1 and acquires, for example, a Web page as a response to display on a display. Consequently, the user of the user terminal 3 can browse information provided by the net supermarket site. In addition, for example, a personal computer, PDA (Personal Digital Assistant), or mobile telephone is applicable to the user terminal 3.

[2. Configuration and Function of Order Receiving Server 1]

Next, the configuration and function of the order receiving server 1 will be described using FIGS. 2 and 3.

Figure 2:
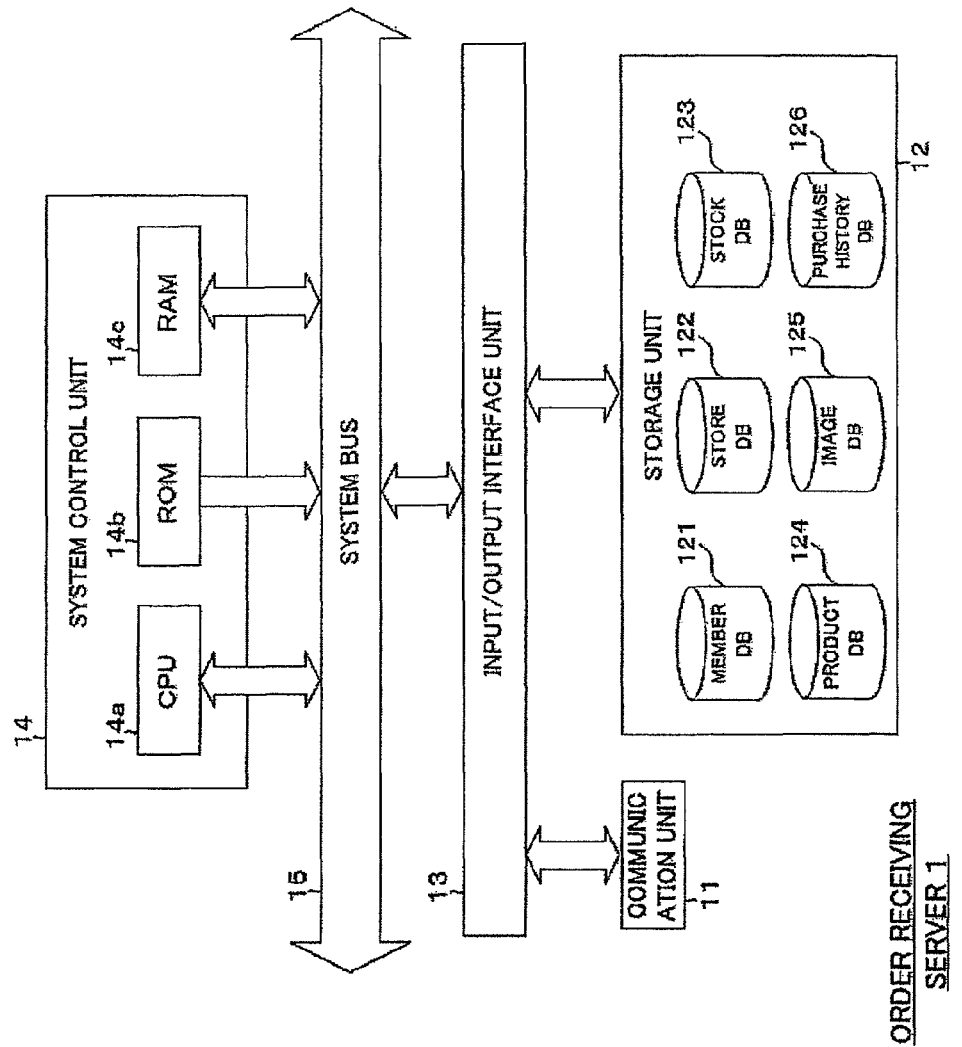
FIG. 2 is a block diagram illustrating an example of a schematic configuration of an order receiving server according to the present embodiment.
Figure 3:
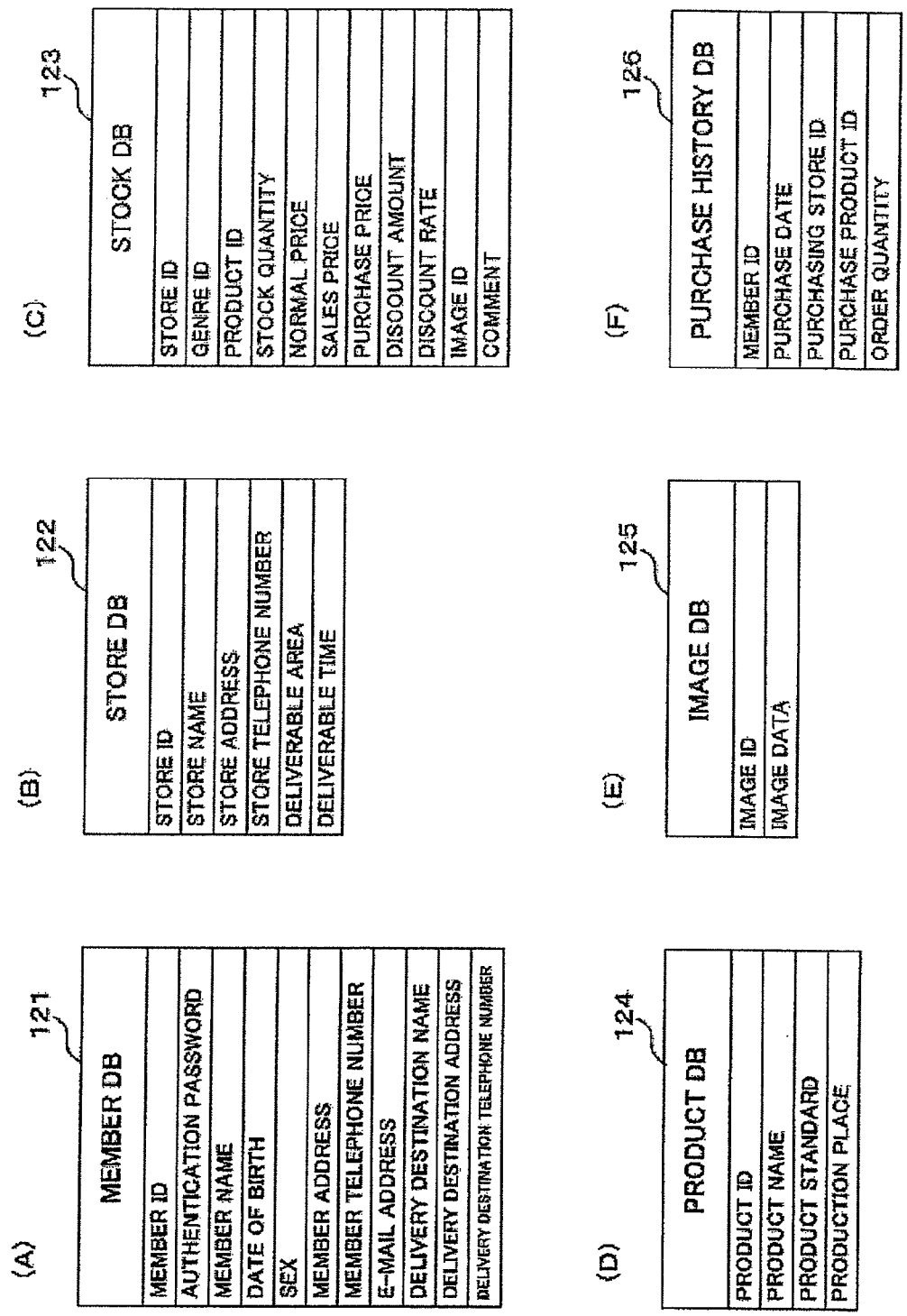
FIG. 3 is a view illustrating an example of content to be registered in various databases.

As illustrated in FIG. 2, the order receiving server 1 has a communication unit 11, a storage unit 12, an input/output interface unit 13 and a system control unit 14. Further, the system control unit 14 and input/output interface unit 13 are connected through a system bus 15.

The communication unit 11 is connected to the network NW to control a communication state with the user terminal 2 or store terminal 3.

The storage unit 12 is formed with, for example, a hard disk drive, and stores various softwares such as operating system and server softwares. In addition, the various softwares may be acquired through the network NW from, for example, other server apparatuses, or may be recorded in a recording medium and read through a drive apparatus.

Further, the storage unit 12 stores site information provided from the net supermarket site to the user terminal 2 or store terminal 3. Meanwhile, the site information includes Web pages of various screens, and data such as an image to be embedded on a Web page.

Further, in the storage unit 12, a member DB (Data Base) 121, a store DB 122, a stock DB 123, a product DB 124, an image DB 125 and a purchase history DB 126 are constructed. In addition, the storage unit 12 is an example of a "product information storage means" and a "purchase history storage means" of the product information providing server apparatus. More specifically, the stock DB 123, product DB 124 and image DB 125 function as the product information storage means, and the purchase history DB 126 functions as the purchase history storage means.

In the member DB 121 illustrated in FIG. 3(A), attribute information (hereinafter, referred to as "member information") such as member IDs, authentication passwords, member names, dates of birth, sex, member addresses, member telephone numbers, e-mail addresses, delivery destination names and delivery destination addresses of registered members (who are users of the net supermarket and customers of products) is registered. The member information can be identified per member according to a member ID. Meanwhile, the member ID is an identifier for identifying a member. Further, the delivery destination means the destination of delivery of a product purchased on the net supermarket. Further, the member ID and authentication password are log-in information used for log-in processing (authentication processing of a member).

In the store DB 122 illustrated in FIG. 3(B), store information such as store IDs, store names, store addresses, store telephone numbers, deliverable areas and deliverable times of supermarkets (including branch stores) opened in the net supermarket is registered. The store information can be identified per supermarket or branch store opened in the net supermarket according to a store ID. Meanwhile, the store ID is an identifier for identifying an opened store or opened branch store.

In the stock DB 123 illustrated in FIG. 3(C), genre IDs, product IDs, stock quantities, normal prices, sales prices, purchase prices, discount amounts, discount rates, image IDs of products covered by a store identified according to a store ID, and store's comments on products are registered per store ID. Meanwhile, the genre ID is an identifier for identifying a genre to which a product belongs. With the present embodiment, the genres including two layers of an upper genre and a lower genre are provided. For example, "fresh food" is provided as the upper genre, and "vegetable", "fruit", "meat" and "fish" are provided as the lower genre of "fresh food" and products such as "Japanese radish" and "onion" belong to "vegetable" of the lower genre. The product ID is an identifier for identifying a type of a product, and the image ID is an identifier for identifying an image of a product. Information registered in the stock DB 123 is adequately updated based on information received from the store terminal 3 disposed at each store. Further, instead of providing the stock DB 123 in the order receiving server 1, it may be possible to provide the stock DB 123 in a storage unit in the store terminal 3 disposed at each store and allow the order receiving server 1 to access the stock DB 123 in the store terminal 3.

In the product DB 124 illustrated in FIG. 3(D), product names, product standards and production places of products are registered per product ID. As product standards, data indicating a size of a product such as L (large), M (middle) and S (small), data indicating the capacity of a product and data indicating packaging units of products (for example, three items in one bag) are registered.

In the image DB 125 illustrated in FIG. 3(E), image data transmitted to the user terminal 2 is registered per image ID. In the image DB 125, image data can be registered by an operation staff of the net supermarket, or can be registered by a staff of the supermarket from the store terminal 3.

In the purchase history DB 126 illustrated in FIG. 3(F), history information related to products purchased by a member by utilizing a net supermarket site is registered. More specifically, member IDs, dates of purchase, purchasing store IDs, purchased product IDs, and order quantities are registered.

The input/output interface unit 13 performs interface processing between the communication unit 11 and storage unit 12, and the system control unit 14.

The system control unit 14 is formed with, for example, a CPU (Central Processing Unit) 14a, a ROM (Read Only Memory) 14b and a RAM (Random Access Memory) 14c. Further, the CPU 14a realizes various functions by reading and executing various programs stored in the ROM 14b and storage unit 12. In addition, the system control unit 14 is an example of a "genre rank determining means", a "display data generating means" and a "transmitting means" of the product information providing server apparatus.

The system control unit 14 generates Web page data ("product list screen Web page data") for displaying a product list screen on the display unit of the user terminal 2, and transmits the Web page data to the user terminal 2.

[3. Configuration and Function of User Terminal 2]

Next, the configuration and function of the user terminal 2 will be described using FIGS. 4 to 6.

Figure 4:
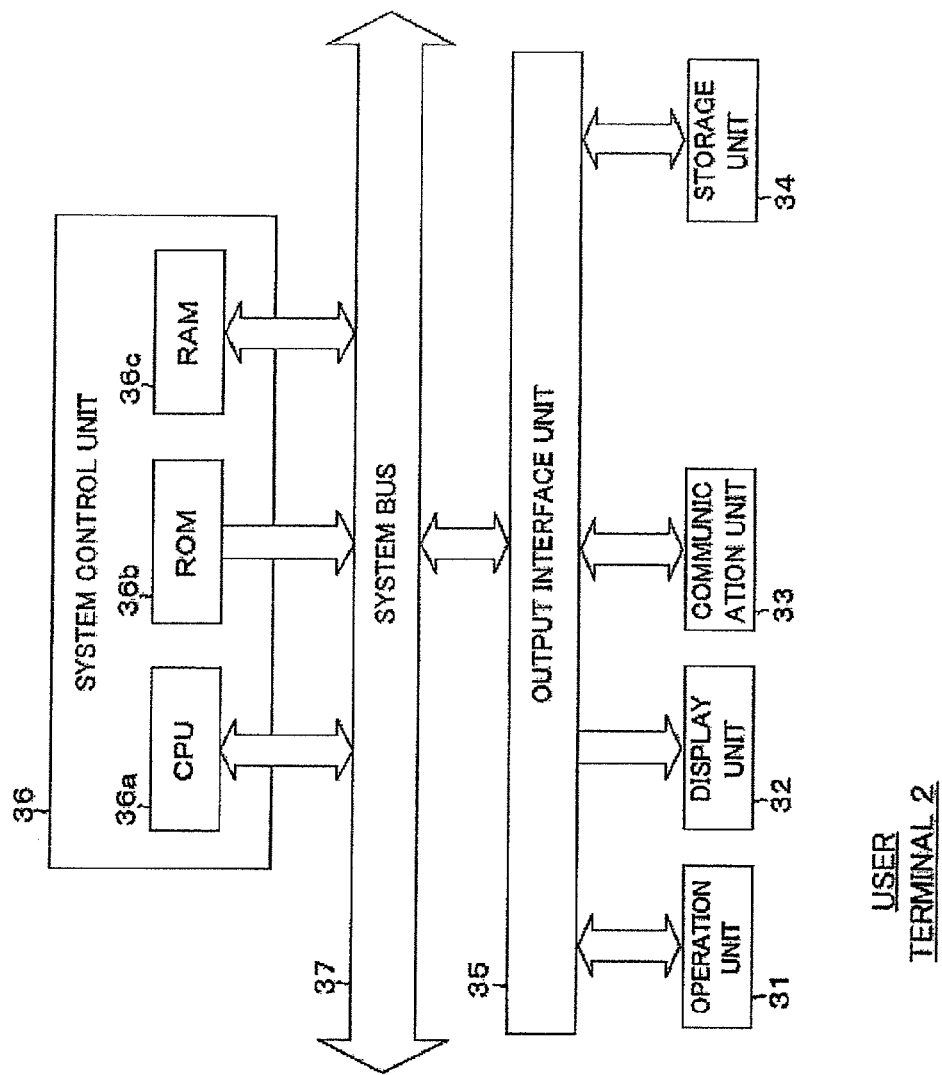
FIG. 4 is a block diagram illustrating an example of a schematic configuration of a user terminal according to the present embodiment.

As illustrated in FIG. 4, the user terminal 2 has an operation unit 31, a display unit 32, a communication unit 33, a storage unit 34, an input/output interface unit 35 and a system control unit 36. Further, the system control unit 36 and input/output interface unit 35 are connected through a system bus 37.

The operation unit 31 includes, for example, a keyboard and mouse, and receives an operation command from the user and outputs the command content to the system control unit 36 as a command signal. The display unit 32 is formed with, for example, a CRT (Cathode Ray Tube) display or liquid crystal display, and displays information such as texts and images.

The communication unit 33 is connected to the network NW to control the communication state with the order receiving server 1.

The storage unit 34 is formed with, for example, a hard disk drive, and stores various softwares such as operating system and browser softwares. In addition, these softwares may be acquired through the network NW from, for example, other server apparatuses, or may be recorded in a recording medium and read through a drive apparatus.

The input/output interface unit 35 performs interface processing between the operation unit 31, display unit 32, communication unit 33 and storage unit 34, and the system control unit 36.

The system control unit 36 is formed with, for example, a CPU (Central Processing Unit) 36a, a ROM (Read Only Memory) 36b and a RAM (Random Access Memory) 36c. Further, the CPU 36a realizes various functions by reading and executing various programs stored in the ROM 36b and storage unit 34. In addition, the system control unit 36 is an example of a "product information receiving means", a "display control means" and a "change operation detecting means" of the terminal device.

Further, when receiving product list screen Web page data from the order receiving server 1, the system control unit 36 makes the display unit 32 display a product list screen. Hereinafter, a product list screen 200 will be described using FIG. 5.

Figure 5:
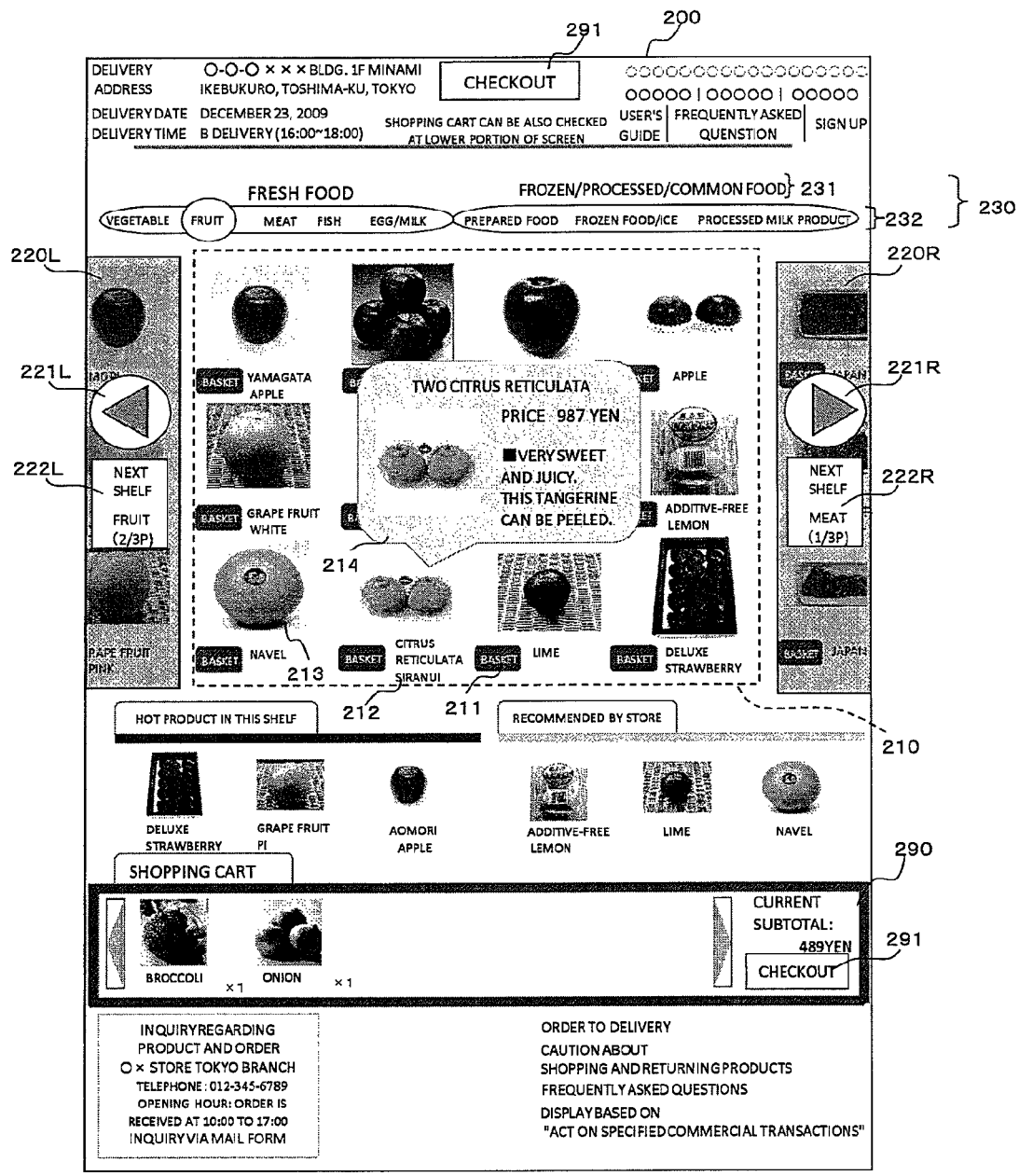
FIG. 5 illustrates a screen example of a product list screen according to the present embodiment.

As illustrated in FIG. 5, in the product list screen 200, a selectable product display area 210 is provided which displays products which the user can select, that is, products which can be registered in the shopping cart 290. In the selectable product display area 210, a shopping cart button 211 is provided per product, and a product name 212 and product image 213 are displayed. Further, when an area which displays the product name 212 or product image 213 is selected (for example, specified using a pointer), a balloon 214 which displays detailed information of a product (including a comment registered in the stock DB 123) is displayed. In addition, information related to products displayed on the product list screen 200 such as the product names 212, product images 213 and detailed information displayed in the balloons 214 is an example of "product information" of the present invention.

On left and right sides of the selectable product display area 210, non-selectable product display areas 220L and 220R are provided which display products which the user cannot select, that is, products which cannot be registered in the shopping cart 290. Products displayed on the non-selectable product display area 220L and 220R are part of a product group which needs to be displayed before or after a product group displayed in the selectable product display area 210. Further, moving buttons 221L and 221R are provided in the non-selectable product display areas 220L and 220R and are pushed (clicked) by the user to slide and switch a product group displayed in the selectable product display area 210 to the product group to be displayed before and after the product group which is displayed at a certain point of time. Further, next page information display areas 222L and 222R are provided in the non-selectable product display areas 220L and 220R and, when the moving button 221L or 221R is pushed (clicked), display information related to a product group to be displayed on the selectable product display area 210.

Further, in the product list screen 200, a genre display area 230 is provided, and displays genre to which products displayed on the selectable product display area 210 belong. More specifically, an upper genre display area 231 and lower genre display area 232 allow the upper genre and lower genre to which products belong to be checked. The example of FIG. 5 illustrates that products displayed on the selectable product display area 210 belong to "fresh food" of the upper genre and "fruit" of the lower genre. In addition, the upper genre display area 231 and lower genre display area 232 can be selected (clicked) by the user and, when a genre different from the genre highlighted at a certain point of time is selected, product information corresponding to products belonging to the selected genre is displayed on the selectable product display area 210.

Hereinafter, products which are displayed on the selectable product display area 210 and non-selectable product display area 220 will be described. FIG. 6 is a conceptual diagram illustrating that a product group Pn including products I belonging to "fresh food" of the upper genre and "egg/milk" of the lower genre is displayed in the selectable product display area 210. In this state, every time the moving button 221L is pushed (clicked), the product group displayed on the selectable product display area 210 is switched to a product group Pn−1, product group Pn−2 and . . . . Similarly, every time the moving button 221R is pushed (clicked), the product group displayed on the selectable product display area 210 is switched to a product group Pn+1, product group Pn+2 and . . . . Further, when the product group Pn is displayed in the selectable product display area 210, part of products of the product group Pn−1 indicated by UL are displayed in the non-selectable product display area 220L and part of products of the product group Pn+1 indicated by UR are displayed in the non-selectable product display area 220R.

In addition, following switch of the product group to be displayed in the selectable product display area 210, display of the genre display area 230 is also switched. As described above, with the present embodiment, product information such as images of a plurality of products arranged based on the genre to which the products I belong is continuously displayed on the product list screen 200.

Back to FIG. 5, the shopping cart 290 is provided in the lower portion of the product list screen 200. In the shopping cart 290, information related to a product corresponding to the shopping cart button 211 pushed (clicked) by the user (information indicating a product name, quantity and subtotal amount) is displayed. Further, a checkout button 291 is provided in the product list screen 200, and is pushed (clicked) to proceed to checkout processing.

[4. Operation of Order Receiving System S]

Next, an operation of the order receiving system S according to one embodiment of the present invention will be described using FIGS. 7 and 8.

An operation of providing information related to a product covered by the net supermarket from the order receiving server 1 to the user terminal 2, receiving the order of the product specified by the user terminal 2 based on this information and transmitting the order content to the store terminal 3 will be described using sequence diagrams illustrates in FIGS. 7 and 8. In addition, before processings illustrated in these sequence diagrams start, the user terminal 2 accesses a net supermarket site, and makes the display unit 32 display a top page (not illustrated) of a net supermarket site.

First, when detecting an operation of transmitting a member ID and password to the order receiving server 1, the system control unit 36 of the user terminal 2 transmits the input member ID and password to the order receiving server 1 (step S101).

When receiving the member ID and password, the system control unit 14 of the order receiving server 1 performs log-in processing (step S102). More specifically, the system control unit 14 searches in the member DB 121 based on the received member ID, checks whether or not a corresponding member ID is registered, and, when the member ID is registered, checks whether or not the received password and the authentication password registered in the member DB 121 match. Further, the system control unit 14 decides that no problem is found in log-in processing only when the corresponding member ID is registered in the member DB 121 and passwords match.

When deciding that a problem is found in the log-in processing, the system control unit 14 transmits error information indicating that an error has occurred in the log-in processing, to the user terminal 2, and makes the user terminal 2 display the error message on the display of the user terminal 2. When deciding that no problem is found in the log-in processing, the system control unit 14 refers to the member DB 121, acquires the registered delivery destination address, then refers to the store DB 122 and acquires a list of stores or branch stores which include the acquired delivery destination address as a deliverable area (step S103).

Next, the system control unit 14 generates Web page data (referred to as "store list screen Web page data") for displaying a store list screen which displays the acquired delivery destination address and store list (step S104), and transmits Web page data to the user terminal 2 (step S105).

When receiving the store list screen Web page data, the system control unit 36 of the user terminal 2 makes the display unit 32 display the store list screen (step S106). When the store list screen is displayed, the user (i) checks whether or not the displayed delivery destination address is an address to receive the ordered product and (ii) selects an order recipient (purchasing) store. In addition, when there is an error in an address or when a product is received at an address different from the delivery destination address, a correct address to receive the product is transmitted as a new delivery destination address to receive the store list screen Web page again from the order receiving server 1. At this time, when receiving the new delivery destination address, the system control unit 14 of the order receiving server 1 acquires again a list of stores including the new delivery destination address as a deliverable area, generates store list screen Web page for displaying the new delivery destination address and the acquired store list, and transmits the store list screen Web page to the user terminal 2.

When the user selects the order recipient store, the system control unit 36 of the user terminal 2 transmits the store ID of the selected store to the order receiving server 1 (step S107).

When receiving the store ID, the system control unit 14 of the order receiving server 1 refers to the stock DB 123, and acquires a product list of products covered by a store matching the received store ID (step S108). Further, the system control unit 14 refers to the product DB 124 and image DB 125, and acquires product information such as information or image data showing product names, sales prices, standards and production places of products included in the acquired product list, and store's comments on products.

Next, the system control unit 14 acquires the genre ID of each product included in the acquired product list (step S109), and determines the genre arrangement order based on the genre ID (step S110). In addition, the arrangement order of products in each genre for products belonging to each genre can be arbitrarily determined, and the products may be arranged according to, for example, the order of product IDs. As described above, the system control unit 14 functions as a genre rank determining means. Next, the system control unit 14 generates product list screen Web page data for displaying product information according to the genre arrangement order (step S111), and transmits the product list screen Web page data to the user terminal 2 (step S112). As described above, the system control unit 14 functions as a display data generating means.

When receiving the product list screen Web page data, the system control unit 36 of the user terminal 2 makes the display unit 32 display the product list screen 200 (step S113). When the product list screen 200 is displayed, the user can register a product in the shopping cart 290 by pushing (clicking) the shopping cart button 232 for the product displayed in the selectable product display area 210. Further, after all products to order are registered in the shopping cart 290, checkout processing can be performed by pushing (clicking) the checkout button 291. When detecting an operation of pushing (clicking) the checkout button 291, the system control unit 36 transmits order data indicating all products registered in the shopping cart 290 and the order quantity, to the order receiving server 1 as illustrated in FIG. 8 (step S201).

When receiving the order data, the system control unit 14 of the order receiving server 1 holds the order data in the storage unit 12 (step S202), and generates order content check screen Web page data for displaying an order content check screen (not illustrated) for making the user check whether or not there is not an error in order content, based on the order data (step S203). Next, the system control unit 14 transmits the order content check screen Web page data, to the user terminal 2 (step S204).

When receiving order content check screen Web page data, the system control unit 36 of the user terminal 2 makes the display unit 32 display the order content check screen (step S205). The order content check screen allows the user to check the order content (ordered products and quantities) on the product list screen 200, and the user checks the order content on the order content check screen and pushes (clicks) an approval button if there is no error. When detecting an operation of pushing (clicking) the approval button, the system control unit 36 transmits approval data indicating that the user approved the order content, to the order receiving server 1 (step S206).

When receiving approval data, the system control unit 14 of the order receiving server 1 registers the order data held in processing in step S202, in the order receiving DB (not illustrated) (step S207). Next, the system control unit 14 generates order completion screen Web page data for displaying an order completion screen (not illustrated) indicating that order reception is completed (step S208), and transmits the order completion screen Web page data to the user terminal 2 (step S209). Further, the system control unit 14 transmits order data registered in the order receiving DB, to the store terminal 3 (step S210).

When receiving order completion screen Web page data, the system control unit 36 of the user terminal 2 makes the display unit 32 display the order completion screen (step S211).

As described above, the user terminal 2 according to the present embodiment is a terminal device which is connected to the order receiving server 1 which provides product information corresponding to products covered by a supermarket (an example "store"), through a network, and the system control unit 36 receives product information of a plurality of products from the order receiving server 1 and makes the display unit 32 display the product list screen 200 which continuously displays product information of a plurality of products arranged based on genres to which products belong.

Consequently, product information of a plurality of products arranged based on genres are continuously displayed on the product list screen 200, so that the user can simulate a sense of getting around in an actual store looking around at one store shelf after another which displays products per genre, and enjoy shopping.

In the shopping mall site, when an order of a product is received, product information such as an image, name and price of a product is displayed on a display unit of a terminal device. However, products covered by the net supermarket ranges include many types and many items ranging from fresh foods to daily goods, and therefore it is usually difficult to display all products covered by the net supermarket, on one screen of the user terminal. Further, instead of displaying all products on one screen of the user terminal, products belonging to product genres which are configured with a plurality of layers are usually displayed per product genre. Hence, to search for a target product, when, for example, the user browses products in genre information and cannot find a desired product, the user needs to search for products after performing an operation of returning to genre information again and moving to a different genre.

Thus, several tens of thousands of products are covered in a net supermarket site, and therefore, when products are displayed with a simple multilayer structure, there are risks that the user cannot enjoy shopping and takes a greater burden to browse products. However, the user terminal 2 according to the present embodiment can also display products belonging to a different genre such that the products can be continuously browsed, so that the user can enjoy shopping.

Further, there are cases where, in an actual supermarket store, while a customer moves to a store shelf which displays a target product, the user picks up a product the user does not intend to purchase, or notices a product which the customer did not care or forget and purchases this product. If, like the user terminal 2 according to the present embodiment, products belonging to a different genre can be displayed to be continuously browsed, the user can surf between different genres without an extra operation. Consequently, the user terminal 2 according to the present embodiment can not only search for a product which the user originally intends to purchase but also collect find an unexpected product or collect information, so that the user can enjoy shopping more.

Further, the system control unit 36 of the user terminal 2 makes the product list screen 200 display the image 213 of a product as product information, so that the user can simulate a sense of actually looking at products displayed in a store shelf and enjoy shopping.

Further, the system control unit 36 of the user terminal 2 makes the selectable product display area 210 of the product list screen 200 display part of products of received product information of a plurality of products at a time, in a state where corresponding products can be selected (a state where a product can be registered in the shopping cart). That is, all pieces of product information received from the order receiving server 1 are not displayed on the product list screen 200 and part of products are displayed on the selectable product display area 210 at a time, so that the user can simulate a sense of sequentially following products displayed on an actual store shelf with own eyes or picking up products, and enjoy shopping.

Furthermore, the system control unit 36 of the user terminal 2 makes the genre display area 230 display information indicating a genre to which products displayed on the selectable product display area 210 belong. Consequently, the user can easily check a genre to which products displayed on the selectable product display area 210 belong.

Furthermore, when detecting an operation with respect to the moving button 221L or 221R for displaying products different from products displayed on the selectable product display area 210, the system control unit 36 of the user terminal 2 slides and switches display of the selectable product display area 210 from products which are currently displayed to different products. Consequently, the user can simulate a sense of checking products displayed in actual store shelves moving the field of view to another part of products at a time, and enjoy shopping.

Furthermore, when displaying the product list screen 200 based on product list screen Web page data and switching display of the selectable product display area 210, the system control unit 36 of the user terminal 2 slides the selectable product display area 210 in a direction (a horizontal direction with an example of FIG. 5) orthogonal to a longitudinal direction (a vertical direction with an example of FIG. 5) of the product list screen 200 defined by the product list screen Web page data. That is, display of products slides in a direction orthogonal to the longitudinal direction of the product list screen 200 and switches, so that, even when the user needs to scroll the screen in the longitudinal direction to check the entire area of the product list screen 200, the user can check products without scrolling the screen.

Furthermore, the system control unit 36 of the user terminal 2 makes the selectable product display area 210 display products which can be registered in the shopping cart 290 and the moving button 221L or 221R is pushed (clicked), so that products to be newly displayed on the selectable product display area 210 are displayed on the non-selectable product display area 220. That is, the user can check products, which is displayed on the selectable product display area 210 by pushing (clicking) the moving button 221L or 221R, without pushing (clicking) the moving button 221L or 221R.

Furthermore, the system control unit 36 of the user terminal 2 displays a genre to which products displayed on the selectable product display area 210 belong, on the genre display area 230, and displays a genre which is different from the above genre and to which one product of products which need to be displayed on the selectable product display area 210 belong. Further, when a genre different from a genre to which products displayed on the selectable product display area 210 belong is selected on the genre display area 230, products belonging to this selected genre are displayed on the selectable product display area 210.

Consequently, when a genre different from the genre to which products displayed on the selectable product display area 210 belong is selected on the genre display area 230, products belonging to this selected genre is displayed on the selectable product display area 210, so that the user can immediately display a genre to which a product the user wants to check belongs, simulate a sense of virtually moving from one store shelf to another in an actual store and enjoy shopping.

Figure 6:
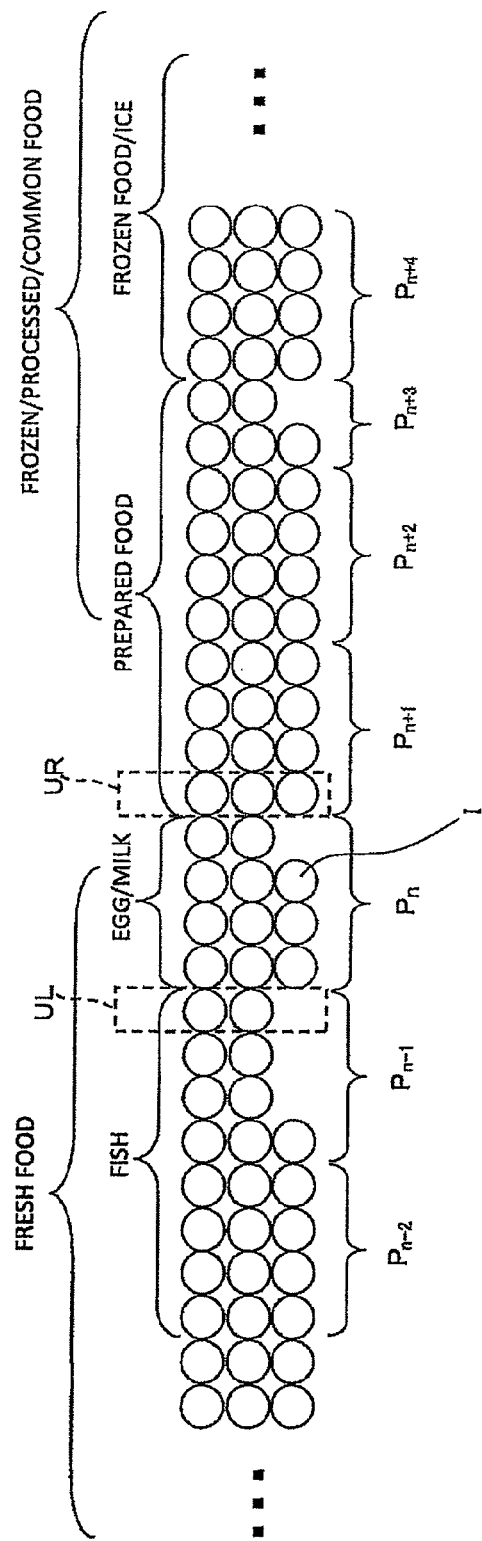
FIG. 6 is a conceptual diagram for describing a method of displaying products displayed on a product list screen.

In addition, with the present embodiment, although part of products arranged per genre are continuously displayed at a time on the selectable product display area 210 as illustrated in FIG. 6, the genre arrangement order is in accordance with product list screen Web page data received from the order receiving server 1. That is, the genre arrangement order is set at the order receiving server 1.

Meanwhile, the system control unit 14 of the order receiving server 1 may adopt an arbitrary method of setting a genre arrangement order, and may be configured to set an arrangement order determined by a supermarket or a staff of the supermarket. When this configuration is employed, products are displayed based on the genre arrangement order set on the order receiving server 1 side (the store side such as a supermarket). By this means, the user can simulate a sense of doing shopping in an actual store looking around at shelves on which the store side freely displays products per genre, and enjoy shopping.

Further, the system control unit 14 of the order receiving server 1 may be configured to set a genre arrangement order such that a genre including more products the user purchased in the past is placed in an earlier rank, that is, an upper rank. In this case, the system control unit 14 refers to the purchase history DB 126, analyzes products the user purchased in the past and genres to which these products belong, and sets the genre arrangement order. When this configuration is employed, a genre including more products the user purchased in the past is arranged in the front, so that the user can check products the user frequently purchases, at an earlier stage.

Further, the system control unit 14 of the order receiving server 1 may be configured to set the genre rank by associating the genre arrangement order with the order the user purchased a plurality of products during one shopping in the past. In this case, the system control unit 14 records selection order information showing the order products are registered in the shopping cart 290, in the purchase history DB 126 when the user purchases a plurality of products during one shopping. Further, the genre arrangement order is set by referring to this selection order information (referring to selection order information immediately before in case where the number of times the user purchases a plurality of products during one shopping is a plurality of times), such that genres to which the purchased products belong are arranged in the order the purchased products are selected. When this configuration is employed, the rank to arrange genres according to the order the user purchased a plurality of products during one shopping in the past, so that the user can check products belonging to these genres according to the genre order the user prefers.

Further, the system control unit 14 of the order receiving server 1 may be configured to set a genre arrangement order such that a genre including more sales products is placed in a higher rank. In this case, the system control unit 14 refers to the stock DB 123, derives the number of products having differences between normal prices and sales prices, and sets the genre arrangement order. When this configuration is employed, a genre including more sales products is arranged in the front, so that the user can efficiently check sales products.

Further, the system control unit 14 of the order receiving server 1 may be configured to set a genre arrangement order such that a genre having a high mean discount rate of products included in the genre is placed in a higher rank. In this case, the system control unit 14 refers to the stock DB 123, derives the mean discount rate of each genre based on the discount rate and sets the genre arrangement order. When this configuration is employed, a genre having a higher mean discount rate of products included in the genre is arranged in the front, so that the user can efficiently check sales products.

Further, although, with the above embodiment, an access to the net supermarket site is made and, immediately after the top page (not illustrated) of the net supermarket site is displayed on the display unit 32, log-in processing is performed, the timing to perform log-in processing is by no means limited to this. For example, log-in processing may be performed when order data indicating all products and order quantities registered in the shopping cart 290 is transmitted to the order receiving server 1. In this case, using Cookie information generated when the user accessed the order receiving server 1 from the terminal device in the past and stored in the terminal device, when the user subsequently accesses the net supermarket site from the terminal device, a list of stores or branch stores may be acquired which includes the delivery destination address of the user as a deliverable area.

The present invention is by no means limited to the above embodiment. The above embodiment is only an example, and the technical scope of the present invention incorporates all apparatuses which have substantially the same configuration as the technical idea disclosed in the claims of the present invention and which provide the same functions and effects.

EXPLANATION OF REFERENCE NUMERALS

1 ORDER RECEIVING SERVER
2 USER TERMINAL
31 USER TERMINAL/OPERATION UNIT
32 USER TERMINAL/DISPLAY UNIT
33 USER TERMINAL/COMMUNICATION UNIT
34 USER TERMINAL/STORAGE UNIT
35 USER TERMINAL/INPUT/OUTPUT INTERFACE UNIT
36 USER TERMINAL/SYSTEM CONTROL UNIT
37 USER TERMINAL/SYSTEM BUS
3 STORE TERMINAL
NW NETWORK
S ORDER RECEIVING SYSTEM

The invention claimed is:

1. A product information providing server apparatus comprising:
at least one memory operable to store program code;
at least one processor operable to read the program code and operate as instructed by the program code, the program code including:
receiving code configured to cause the at least one processor to receive an identification (ID) of a selected store from a terminal device through a network;
display data generating code configured to cause the at least one processor to, in response to receiving the ID of the selected store, generate display data, which is Web page data comprising a product list screen that displays product information corresponding to a first subset of the plurality of products, arranged based on genres, in a selectable state in a selectable product display area, and simultaneously displays product information corresponding to a part of a second subset of the plurality of products, different from the product information corresponding to the first subset of the plurality of products, in a non-selectable state in a non-selectable product display area that is next to the selectable product display area, the product list screen simultaneously further displaying a moving instruction object in the non-selectable product display area; and
transmitting code configured to cause the at least one processor to transmit the display data generated by the display data generating code, to the terminal device through the network such that a Web page is displayed on a display of the terminal device based on the transmitted display data, wherein
products in the selectable state are selectable for purchase, by a user of the terminal device, and products in the non-selectable state are not selectable for purchase, by the user of the terminal device;
the product information corresponding to the first subset of the plurality of products arranged in the selectable state in the selectable product display area are moved to the non-selectable product display area and arranged in the non-selectable state, in response to a user input operation from the terminal device with respect to the moving instruction object on the Web page, and
the product information corresponding to the part of the second subset of the plurality of products arranged in the non-selectable state in the non-selectable product display area are moved to the selectable product display area and arranged in the selectable state, in response to the user input operation from the terminal device with respect to the moving instruction object on the Web page.

2. The product information providing server apparatus according to claim 1, wherein the product information includes product image information.

3. The product information providing server apparatus according to claim 2, wherein the product list screen further displays information regarding a genre that represents the first subset of the plurality of products.

4. The product information providing server apparatus according to claim 3, wherein:
the product list screen further displays information regarding a first genre that represents the first subset of the plurality of products whose product information is in a selectable state, and information regarding a second genre that is different from the first genre and that represents at least one of the plurality of products; and when the second genre is selected, the product list screen displays product information corresponding to products belonging to the selected second genre, from among the plurality of products.

5. The product information providing server apparatus according to claim 1, wherein, when a user of the terminal device performs an input operation, the product information corresponding to the first subset of the plurality of products is replaced, in a sliding transition, with product information corresponding to the second subset of the plurality of products.

6. The product information providing server apparatus according to claim 5, wherein the sliding transition is in a direction orthogonal to a longitudinal direction of the product list screen.

7. The product information providing server apparatus according to claim 3, wherein the product list screen displays product information of the plurality of products arranged based on a genre rank information.

8. The product information server apparatus according to claim 1, wherein the program code further includes genre rank determining code configured to cause the at least one processor to determine an arrangement of genre information based on a rank, in the terminal device, wherein the product list screen displays product information of the plurality of products which are arranged based on a rank of the genre information determined in the genre rank determining code.

9. The product information providing server apparatus according to claim 8, wherein the program code further includes purchase history storage code configured to cause the at least one processor to store purchase history of a user of the terminal device, wherein the genre rank determining code causes the at least one processor to refer to the purchase history storage, and determine an arrangement of the genre information based on past purchases made by the user.

10. The product information providing server apparatus according to claim 8, wherein the program code further includes purchase history storage code configured to cause the at least one processor to store purchase history of a user of the terminal device, wherein the genre rank determining code causes the at least one processor to refer to the purchase history storage, and rank the genres based on a single past purchase of a plurality of products by the user.

11. The product information providing server apparatus according to claim 8, wherein the genre rank determining code causes the at least one processor to rank the genres based on the number of products from among the plurality of products it includes.

12. The product information providing server apparatus according to claim 8, wherein the genre rank determining code causes the at least one processor to rank the genres based on a mean discount rate of products per genre.

13. A product information display method, performed by a terminal device, including at least one processor, the method comprising:

said at least one processor connecting to a product information providing server apparatus through a network, and transmitting an identification (ID) of a selected store to the product information providing server;

said at least one processor receiving from the product information providing server, in response to transmitting the ID of the selected store, Web page data comprising a product list screen that displays product information corresponding to a first subset of the plurality of products, arranged based on genres, in a selectable state in a selectable product display area, and simultaneously displays product information corresponding to a part of a second subset of the plurality of products, different from the product information corresponding to the first subset of the plurality of products, in a non-selectable state in a non-selectable product display area that is next to the selectable product display area, the product list screen simultaneously further displaying a moving instruction object in the non-selectable product display area; and said at least one processor displaying a Web page on a display of the terminal device based on the received Web page data, wherein products in the selectable state are selectable for purchase, by a user of the terminal device, and products in the non-selectable state are not selectable for purchase, by the user of the terminal device;

the product information corresponding to the first subset of the plurality of products arranged in the selectable state in the selectable product display area are moved to the non-selectable product display area and arranged in the non-selectable state, in response to a user input operation from the terminal device with respect to the moving instruction object on the Web page, and the product information corresponding to the part of the second subset of the plurality of products arranged in the non-selectable state in the non-selectable product display area are moved to the selectable product display area and arranged in the selectable state, in response to the user input operation from the terminal device with respect to the moving instruction object on the Web page.

14. A product information providing system comprising: a product information providing server apparatus that provides product information corresponding to a plurality of products covered by a store; and a terminal device that is connected to the product information providing server apparatus through a network, wherein the terminal device comprises: at least one memory operable to store program code; at least one processor operable to read the program code and operate as instructed by the program code, the program code including: transmitting code configured to cause the at least one processor to transmit an identification (ID) of a selected store to the product information providing server; receiving code configured to cause the at least one processor to receive from the product information providing server apparatus, in response to transmitting the ID of the selected store, Web page data comprising a product list screen that displays product information corresponding to a first subset of the plurality of products, arranged based on genres, in a selectable state in a selectable product display area, and simultaneously displays product information corresponding to a part of a second subset of the plurality of products, different from the product information corresponding to the first subset of the plurality of products, in a non-selectable state in a non-selectable product display area that is next to the selectable product display area, the product list screen simultaneously further displaying a moving instruction object in the non-selectable product display area that is next to the selectable product display area; and displaying code configured to cause the at least one processor to display a Web page on a display of the terminal device based on the received Web page data, wherein products in the selectable state are selectable for purchase, by a user of the terminal device, and products in the non-selectable state are not selectable for purchase, by the user of the terminal device; the product information corresponding to the first subset of the plurality of products arranged in the selectable state in the selectable product display area are moved to the non-selectable product display area and arranged in the non-selectable state, in response to a user input operation from the terminal device with respect to the moving instruction object on the Web page, and the product information corresponding to the part of the second subset of the plurality of products arranged in the non-selectable state in the non-selectable product display area are moved to the selectable product display area and arranged in the selectable state, in response to the user input operation from the terminal device with respect to the moving instruction object on the Web page.

15. A terminal device comprising:
at least one memory operable to store program code;
at least one processor operable to read the program code and operate as instructed by the program code, the program code including:
transmitting code configured to cause the at least one processor to transmit an identification (ID) of a selected store to a product information providing server apparatus through a network;
product information receiving code configured to cause the at least one processor to receive, from the product information providing server through the network, in response to transmitting the ID of the selected store, Web page data comprising a product list screen that displays product information corresponding to a first subset of the plurality of products, arranged based on genres, in a selectable state in a selectable product display area, and simultaneously displays product information corresponding to a part of a second subset of the plurality of products, different from the product information corresponding to the first subset of the plurality of products, in a non-selectable state in a non-selectable product display area that is next to the selectable product display area, the product list screen simultaneously further displaying a moving instruction object in the non-selectable product display area; and
display control code configured to cause the at least one processor to control a display of the terminal device to display a Web page based on the received Web page data, wherein
products in the selectable state are selectable for purchase, by a user of the terminal device, and products in the non-selectable state are not selectable for purchase, by the user of the terminal device;
the product information corresponding to the first subset of the plurality of products arranged in the selectable state in the selectable product display area are moved to the non-selectable product display area and arranged in the non-selectable state, in response to a user input operation from the terminal device with respect to the moving instruction object on the Web page, and
the product information corresponding to the part of the second subset of the plurality of products arranged in the non-selectable state in the non-selectable product display area are moved to the selectable product display area and arranged in the selectable state, in response to the user input operation from the terminal device with respect to the moving instruction object on the Web page.

16. The terminal device according to claim 15, wherein the display control code causes the at least one processor to control the display of the terminal device to display a product list screen that displays product information corresponding to products, from among the plurality of products, that belong to a genre different from genres representing the first subset of the plurality of products, in a non-selectable state.

17. The terminal device according to claim 15, wherein:
the display control code causes the at least one processor to control the product list screen to display information regarding a first genre that represents the first subset of the plurality of products whose product information is in a selectable state, and information regarding a second genre that is different from the first genre and that represents at least one of the plurality of products; and
when the second genre is selected, the display control code causes the at least one processor to control the product list screen to display product information corresponding to products belonging to the selected second genre, from among the plurality of products.

18. The terminal device according to claim 15, further comprising: change operation detecting code configured to cause the at least one processor to detect a user input,
wherein, in response to the user input operation, the product information corresponding to the first subset of the plurality of products is replaced, in a sliding transition, with product information corresponding to a third subset of the plurality of products.

19. The terminal device according to claim 18, wherein:
the sliding transition is in a direction orthogonal to a longitudinal direction of the product list screen.

20. A non-transitory computer-readable recording medium on which product information display program is recorded, the product information display program causing a computer to:
transmit an identification (ID) of a selected store to a product information providing server apparatus through a network;
receive, from the product information providing server through the network, in response to transmitting the ID of the selected store, Web page data comprising a product list screen that displays product information corresponding to a first subset of the plurality of products, arranged based on genres, in a selectable state in a selectable product display area, and simultaneously displays product information corresponding to a part of a second subset of the plurality of products, different from the product information corresponding to the first subset of the plurality of products, in a non-selectable state in a non-selectable product display area that is next to the selectable product display area, the product list screen simultaneously further displaying a moving instruction object in the non-selectable product display area; and
control a display of the terminal device to display a Web page based on the received Web page data, wherein
products in the selectable state are selectable for purchase, by a user of the terminal device, and products in the non-selectable state are not selectable for purchase, by the user of the terminal device;
the product information corresponding to the first subset of the plurality of products arranged in the selectable state in the selectable product display area are moved to the non-selectable product display area and arranged in the non-selectable state, in response to a user input operation from the terminal device with respect to the moving instruction object on the Web page, and the product information corresponding to the part of the second subset of the plurality of products arranged in the non-selectable state in the non-selectable product display area are moved to the selectable product display area and arranged in the selectable state, in response to the user input operation from the terminal device with respect to the moving instruction object on the Web page.

21. The product information providing server apparatus according to claim 1, wherein the product list screen displays product information corresponding to products, from among the plurality of products, that belong to a genre different from genres representing the first subset of the plurality of products, in a non-selectable state.

22. The product information providing server apparatus according to claim 1, wherein the product information corresponding to the first subset of the plurality of products are arranged based on at least one genre in a selectable product display area and moved to a non-selectable product display area next to the selectable product display area in response to a user input operation, the product information corresponding to the part of the second subset of the plurality of products are arranged in the non-selectable product display area based on at least one genre except for the genre in the selectable product display area and moved to the selectable product display area in response to the user input operation, and the product information corresponding to the first subset of the plurality of products in said selectable product display area is displayed in a selectable state and the product information corresponding to the part of the second subset of the plurality of products in said non-selectable product display area is displayed in a non-selectable state.

23. The product information providing server apparatus according to claim 1, wherein the moving instruction object is provided so as to overlap a portion of the product information corresponding to the part of the second subset of the plurality of products.

* * * * *